United States Patent
Jensen et al.

(10) Patent No.: US 6,547,224 B2
(45) Date of Patent: Apr. 15, 2003

(54) PNEUMATIC SELF LEVELING SUSPENSION DAMPER

(75) Inventors: Eric Lee Jensen, Dayton, OH (US); William Charles Kruckemeyer, Beavercreek, OH (US); Troy Allen Miller, Xenia, OH (US); Ronald Gene Smith, Jr., New Carlisle, OH (US); Michael Leslie Oliver, Xenia, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/834,310

(22) Filed: Apr. 12, 2001

(65) Prior Publication Data

US 2002/0148692 A1 Oct. 17, 2002

(51) Int. Cl.$^7$ .................................................. F16F 9/08
(52) U.S. Cl. ............................ 267/64.17; 267/DIG. 2
(58) Field of Search ................... 267/DIG. 2, 64.28, 267/64.27, 64.18, 64.21, 64.23, 64.24, DIG. 1

(56) References Cited

U.S. PATENT DOCUMENTS

| | | | | | |
|---|---|---|---|---|---|
| 2,443,730 A | * | 6/1948 | Gruss | .................... | 267/DIG. 2 |
| 3,046,033 A | * | 7/1962 | Schultz | .................. | 267/DIG. 2 |
| 3,376,632 A | * | 4/1968 | Schmid | .................... | 267/64.17 |
| 3,904,183 A | * | 9/1975 | Allinquant et al. | ...... | 267/64.17 |
| 4,342,446 A | * | 8/1982 | Eaton et al. | ............. | 267/64.17 |

* cited by examiner

*Primary Examiner*—Matthew C. Graham
(74) *Attorney, Agent, or Firm*—Scott A. McBain

(57) ABSTRACT

A suspension damper includes a reservoir housing with a piston slidably mounted therein and including a piston rod extending from the reservoir housing and attached to the vehicle by a mount assembly. An air chamber is defined by a sleeve cirucmscribing the piston rod and connected to the reservoir housing by a flexible portion. The mount assembly includes a pumping chamber which expands and contracts in response to normal road undulations to inflate the air chamber. A valve controlled by the flexible portion of the sleeve controls communication from the air chamber to ambient atmosphere to thereby control inflation of the air chamber and thereby controlling ride height.

17 Claims, 3 Drawing Sheets

PNEUMATIC SELF LEVELING SUSPENSION DAMPER

TECHNICAL FIELD

This invention relates to a damper for a motor vehicle suspension system that includes a pneumatic self-leveling capability to maintain the ride height of the vehicle at a desired level.

BACKGROUND OF THE INVENTION

Motor vehicles, such as passenger cars and light trucks, experience wide variations in loading. Accordingly, it is desirable to adjust the spring rate and load of the suspension system to compensate for variations in vehicle loading, and accordingly maintain the ride height of the vehicle despite the variations in loading.

Several devices are known in the prior art that compensate for varying vehicle loads to maintain ride height. These devices include air springs mounted on the vehicle either parallel to the main spring or as a replacement for the main spring, and an air spring in combination with a suspension damper, commonly referred to as an "air shock". All of these devices require an air compressor to provide compressed air to the device, a sensor which measures ride height and actuates the compressor, and a solenoid valve to release air when the vehicle loading is reduced. Accordingly, these devices are expensive, difficult to install, and require that the vehicle have the necessary electrical and mechanical infrastructure to permit their use. Hydro-pneumatic systems, in which hydraulic fluid is pumped into the gas chamber of a gas charged damper to adjust ride height are also used to maintain ride height. These systems also require pumps, valves, etc. and tend to be costly and heavy. Finally, a self-contained device sold by Mannesmann Sachs AG of Schweinfurt, Germany under the trade name Nivomat includes a pumping mechanism, level sensor, hydro-pneumatic spring and damper that uses normal road undulations to pump up the suspension to maintain ride height. This device is easy to install but is expensive and compromises the ride quality of the vehicle suspension.

SUMMARY OF THE INVENTION

According to the present invention, a suspension damper includes a reservoir housing with a piston slidably mounted therein and including a piston rod extending from the reservoir housing and attached to the vehicle by a mount assembly. An air chamber is defined by a sleeve or dust cover cirucmscribing the piston rod and connected to the reservoir housing by a flexible sleeve. The mount assembly includes a pumping chamber which expands and contracts in response to normal road undulations to inflate the air chamber. A valve controlled by the flexible sleeve controls communication from the air chamber to ambient atmosphere to thereby control inflation of the air chamber, thereby controlling ride height.

DESCRIPTION OF THE PREFERRED EMBODIMENT

Figure 1:
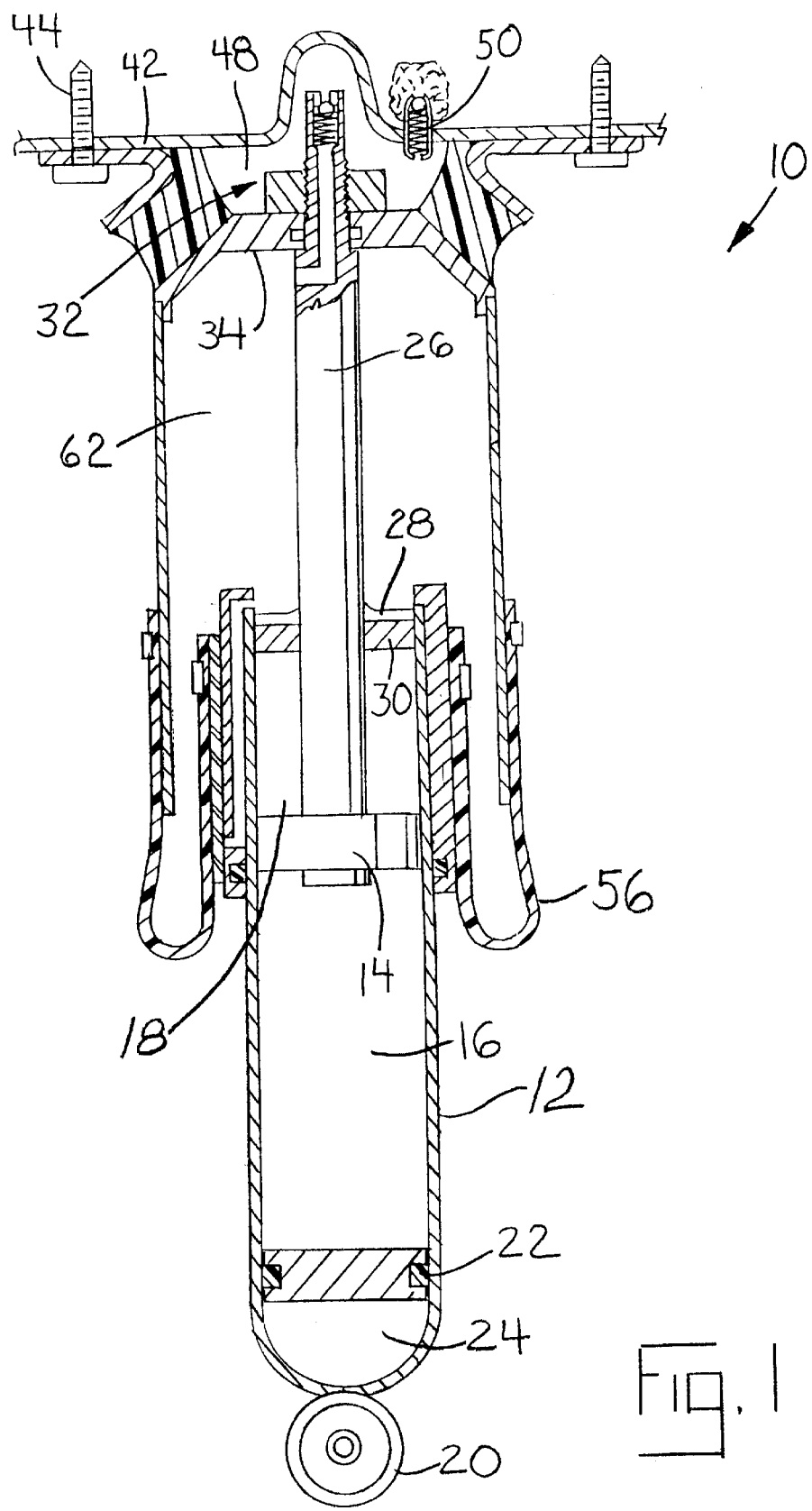
FIG. 1 is a cross-sectional view of a suspension damper made pursuant to the teachings of the present invention.
Figure 2:
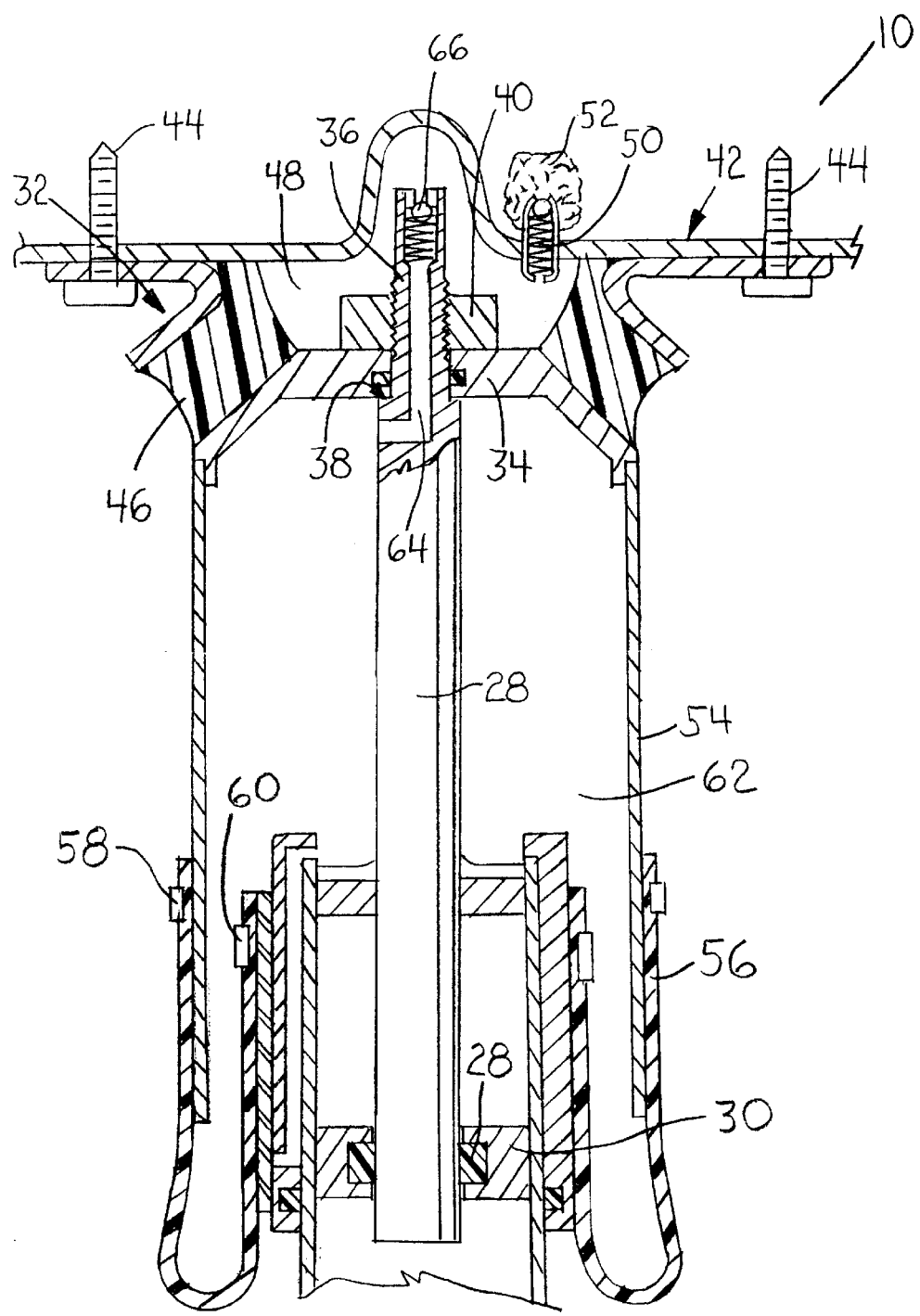
FIG. 2 is an enlarged, fragmentary cross sectional view of the upper portion of FIG. 1 illustrating details of the invention not shown in FIG. 1.

Referring now to the drawings, a suspension damper of a type commonly referred to as an "air shock" is generally indicated by the numeral 10 and includes the features of the present invention. Damper 10 includes a tubular reservoir housing 12 filled with damping fluid in which a conventional damper piston 14 is slidably mounted. The damper piston 14 divides the volume defined within the reservoir housing 12 into a compression chamber 16 and a rebound chamber 18. The damper piston 14 includes valving (not shown) within the piston 14 that controls communication of damping fluid across the piston to thereby provide damping of suspension oscillations in a manner well known to those skilled in the art. An attachment fitting 20 is mounted on the lower end of the reservoir housing 12 for mounting on an unsprung mass of the vehicle on which the damper 10 is used. A gas cup 22 is slidably mounted within the housing 12 and separates the compression chamber 16 from a chamber 24 charged with a compressed gas. The gas cup moves within the housing 12 to accommodate the change in volume as a result of movement of piston rod 26 that extends from piston 14 within housing 12, and also to prevent cavitation of damping fluid.

The piston rod 26 extends from the piston 14 through the rebound chamber 18 and through appropriate seal 28 in upper end closure member 30, which closes the upper end (viewing the FIGURES) of the housing 12. The piston rod 26 terminates in a mount assembly 32 for securing the damper 10 to the sprung mass (body) of the vehicle upon which the damper 10 is used. Mount assembly 32 includes a lower plate 34, which defines an aperture through which the piston rod 26 extends. The piston rod 26 terminates in a reduced portion 36 defining a shoulder 38, which engages one side of the plate 34. A nut 40 is threaded on reduced portion 36 and clamps the plate 34 against the shoulder 38, thereby securing the rod 26 to the plate 34. Mount assembly 32 further includes an upper plate assembly 42, which is secured to the body of the vehicle upon which damper 10 is used by appropriate fasteners 44. A circumferentially extending, flexible, elastomeric isolator 46 secures the plate 34 to the plate assembly 42, and permits the plate 34 to flex relative to the plate assembly 42 in response to displacement of the reservoir housing 12 and piston rod 26 in both the compression and rebound directions in response to movement of the vehicle over normal road undulations. Accordingly, the plate 34, plate assembly 42, and elastomeric isolator 46 cooperate to define a pumping chamber 48 which contracts and expands in response to movement over the normal road undulations, causing the elastomeric isolator to flex. An inlet check valve 50 communicates the pumping chamber 48 with ambient atmosphere through a foam filter 52. Accordingly, when pumping chamber 48 expands, air is drawn into pumping chamber 48 through inlet check valve 50.

A rigid sleeve or dust tube 54 extends from the plate 34 and circumscribes the piston rod 26. The sleeve 54 terminates in a flexible sleeve 56 which circumscribes the reservoir housing 12 and is attached to the sleeve 54 and to the housing 12 by circumferentially extending clamping rings 58, 60. Accordingly, the sleeve 54, flexible sleeve 56, housing 12 and plate 34 cooperate to define an air chamber 62, which may be inflated to control the relative positions of the reservoir housing 12 and mount assembly 32 and thereby control the riding height of the vehicle. Compressed air from pumping chamber 48 is communicated into air chamber 62 through a passage 64 extending through reduced diameter portion 36 of piston rod 26. A check valve 66 permits communication from pumping chamber 48 into the air chamber 62, but prevents communication in the reverse direction.

Figure 4:
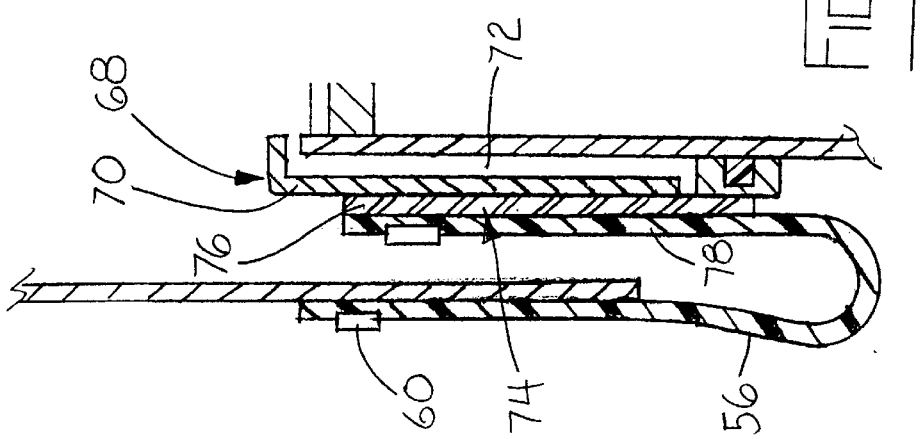
FIG. 4 is a view similar to FIG. 3 but illustrating the control valve in another position.

A control valve assembly generally indicated by reference numeral 68 is mounted on the outer circumferential surface of the reservoir housing 12 and controls inflation of the air chamber 62. Valve assembly 68 includes a sleeve 70 defining a passage 72 communicating the air chamber 62 with ambient atmosphere and a resilient valve reed 74 which is clamped at its upper end 76 between the flexible sleeve 56 and the sleeve 70 by clamping ring 60, the resiliency of the reed 74 biasing the latter in a direction away from the sleeve 70. The flexible sleeve 56 includes a portion 78 extending from clamping ring 60 that rolls along the outer surface of the sleeve 70 and the valve reed 74. The portion 78 presses the valve reed 74 against the sleeve 70 to close off the passage 72 before the vehicle attains the appropriate riding height, as indicated in FIG. 4. As the proper riding height is attained, the portion 78 rolls up the reservoir housing 12, allowing the valve reed 74 to flex and thereby opening the passage 72. Accordingly, valve sleeve 74 acts as both a check valve and a protective sleeve to prevent damage to the flexible sleeve 56.

Figure 3:
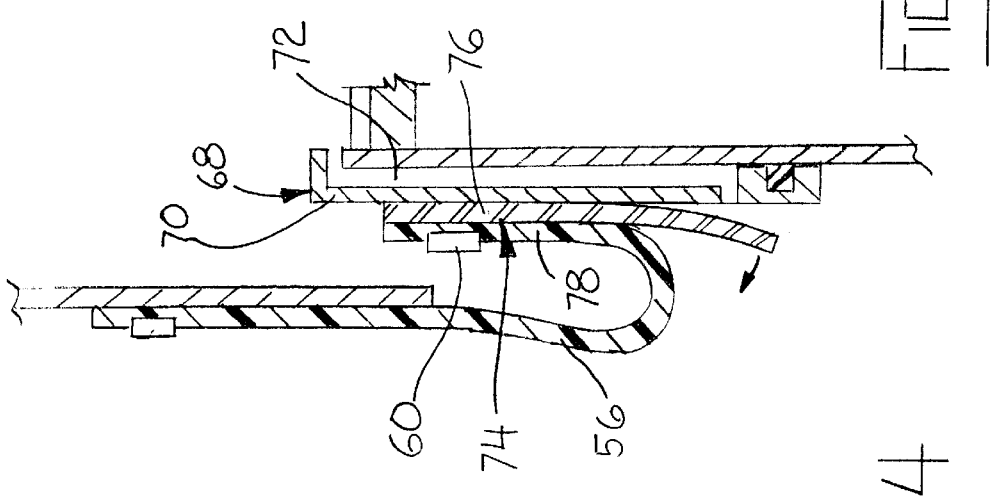
FIG. 3 is an enlarged, fragmentary, cross sectional detail view of the circumscribed portion of FIG. 1 illustrating the valving mechanism that controls inflation of the air chamber of the damper illustrated in FIGS. 1 and 2.

In operation, the reservoir housing 12 and piston rod 26, in response to normal road undulations, move toward the plate assembly 42 in a compression stroke of the damper 10 and move away from the plate assembly 42 in a rebound stroke of the damper 10. The elastomeric isolator 46 allows the plate 34 to move toward the plate assembly 42 during the compression stroke, thereby contracting the pumping chamber 48 and forcing compressed air into the air chamber 62, the air being forced through passage 64 and check valve 66. During a rebound stroke of the damper 10, the reservoir housing 12 and piston rod 26 move away from plate assembly 42, thus expanding the pumping chamber 48 and drawing ambient air through the check valve 50 into the pumping chamber 48, the passage 64 then being closed by check valve 66. Accordingly, air chamber 62 is inflated, thereby forcing the reservoir housing 12 away from the plate assembly 42 (which is directly attached to the body of the vehicle), thereby increasing the ride height of the vehicle. While this occurs, the flexible sleeve 56 maintains valve reed 74 in a position closing the passage 72, as illustrated in FIG. 4. As the ride height of the vehicle is increased, portion 78 of flexible sleeve 56 rolls upwardly. When proper ride height is attained as indicated in FIG. 3, the flexible sleeve 56 permits the valve reed 74 to open, thereby terminating inflation of the air chamber. When vehicle loading is reduced, the valve reed 74 remains open to allow venting of the air chamber.

What is claimed is:

1. A suspension damper comprising a reservoir housing, a damper piston slidable within said reservoir housing and including a piston rod having a projecting portion extending from one end of the housing, an outer sleeve including a flexible portion circumscribing said projecting portion of said piston rod and cooperating with said housing to define an air chamber, and an air pump having a pumping chamber communicated with said air chamber, said pumping chamber capable of expanding and contracting in response to movement of the damper for inflating said air chamber with ambient atmosphere wherein a passage permits restricted communication of air from said air chamber to ambient atmosphere, and a control valve controlling communication through said passage to thereby control inflation of said air chamber.

2. Suspension damper as claimed in claim 1, wherein a mount assembly is mounted on said piston rod for securing said piston rod to said motor vehicle, said mount assembly including an elastomeric isolator circumscribing said damper, said elastomeric isolator flexing in response to said normal road undulations.

3. Suspension damper as claimed in claim 1, wherein said control valve is responsive to the riding height of said motor vehicle on which the suspension damper is installed, said control valve opening said passage when a predetermined riding height is attained to maintain said predetermined riding height, said control valve closing said passage when the riding height of the vehicle is below the predetermined riding height to permit continued inflation of said air chamber.

4. Suspension damper for installation on a motor vehicle comprising:
   a reservoir housing,
   a damper piston slidable within said reservoir housing and including a piston rod having a projecting portion extending from one end of the housing;
   an outer sleeve including a flexible portion circumscribing said projecting portion of said piston rod and cooperating with said housing to define an air chamber;
   a mount assembly mounted on said piston rod for securing said piston rod to said motor vehicle, said mount assembly including an elastomeric isolator circumscribing said damper, said elastomeric isolator flexing in response to said normal road undulations; and
   an air pump having a pumping chamber communicated with said air chamber, wherein:
       said pumping chamber expanding and contracting in response to movement of the damper in response to movement of the vehicle over normal road undulations for inflating said air chamber; and
       said pumping chamber being defined within said mounting member, said pumping chamber being expanded and contracted in response to flexing of said isolator.

5. Suspension damper as claimed in claim 4, wherein said mounting member includes a pair of rigid members, said isolator being connected between said rigid member.

6. Suspension damper as claimed in claim 5, wherein one of said rigid members is a transversely extending portion of said sleeve extending transversely with respect to said piston rod, said piston rod being secured to said one rigid member.

7. Suspension damper as claimed in claim 4, wherein a first check valve communicates said pumping chamber with ambient atmosphere, said first check valve permitting communication of air between atmosphere and said pumping chamber but preventing communication in the reverse direction, and a second check valve communicating said pumping chamber with said air chamber, said second check valve permitting communication of air from said pumping chamber to said air chamber but preventing communication in the reverse direction.

8. Suspension damper as claimed in claim 7, wherein a passage permits restricted communication of air from said air chamber to ambient atmosphere, and a control valve controlling communication through said passage to thereby control inflation of said air chamber.

9. Suspension damper as claimed in claim 8, wherein said control valve is responsive to the riding height of said motor vehicle on which the suspension damper is installed, said control valve opening said passage when a predetermined riding height is attained to maintain said predetermined riding height, said control valve closing said passage when the riding height of the vehicle is below the predetermined riding height to permit continued inflation of said air chamber.

10. Suspension damper as claimed in claim 8, wherein said control valve is controlled by the change of relative positions of said reservoir housing and said outer sleeve.

11. Suspension damper as claimed in claim 8, wherein said flexible portion is a flexible sleeve engaging said reservoir housing, said control valve being controlled by a change in position of said flexible sleeve.

12. Suspension damper as claimed in claim 11, wherein said control valve is a valve reed movable between postions opening and closing said passage and engaged by said flexible sleeve, said flexible sleeve moving said valve means between said positions opening and closing said passage.

13. Suspension damper as claimed in claim 8, wherein said flexible portion is a flexible sleeve extending along said reservoir housing, said control valve being controlled by a change in position of said flexible sleeve relative to said reservoir housing.

14. Suspension damper as claimed in claim 13, wherein said control valve is a valve reed movable between postions opening and closing said passage and engaged by said flexible portion, said flexible sleeve moving said valve means between said positions opening and closing said passage.

15. Suspension damper for installation on a motor vehicle comprising a reservoir housing, a damper piston slidable within said reservoir housing and including a piston rod having a projecting portion extending from one end of the housing, an outer sleeve including a flexible portion circumscribing said projecting portion of said piston rod and cooperating with said housing to define an air chamber, an air pump responsive to normal road undulations for inflating said air chamber, and a control valve responsive to the riding height of the motor vehicle upon which the suspension damper is installed, said control valve being operated by said flexible portion, said control valve communicating said air chamber with ambient atmosphere when a predetermined riding height is attained to maintain said predetermined riding height, said control valve closing communication between said air chamber and ambient atmosphere when the riding height of the vehicle is below the predetermined riding height to permit continued inflation of said air chamber.

16. Suspension damper as claimed in claim 15, wherein said control valve is controlled by the change of relative positions of said reservoir housing and said outer sleeve.

17. Suspension damper for installation on a motor vehicle comprising a reservoir housing, a damper piston slidable within said reservoir housing and including a piston rod having a projecting portion extending from one end of the housing, an outer sleeve circumscribing said projecting portion of said piston rod and having a flexible sleeve, said outer sleeve cooperating with said housing to define an air chamber, an air pump for inflating said air chamber, and a control valve being responsive to the riding height of the motor vehicle upon which the suspension damper is installed, said control valve is a valve reed movable between positions opening and closing said passage and engaged by said flexible sleeve, said flexible sleeve moving said valve means between said positions opening and closing said passage.

* * * * *